United States Patent Office 3,123,467
Patented Mar. 3, 1964

3,123,467
DEGASSING MAGNESIUM-BASE ALLOY
Adolph T. Peters, Midland, Mich., assignor to The Dow Chemical Company, Midland, Mich., a corporation of Delaware
Filed May 3, 1961, Ser. No. 107,389
3 Claims. (Cl. 75—93)

The invention relates to a method of degassing molten magnesium-base alloy with a stream of chlorine gas to reduce the hydrogen content of the molten alloy and more particularly relates to an improvement in the method of degassing molten magnesium-base alloy with chlorine gas following grain refining of the melt with carbon or a carbon-containing grain refining agent.

For the purposes of the specification and claims, a magnesium-base alloy is defined as an alloy containing at least 75 weight percent of magnesium.

Heretofore difficulties have been encountered in preparing a fine-grained casting of magnesium-base alloy which is also substantially free of "blows" and gas porosity. If the melt is first degassed by injecting gaseous chlorine into the melt and then grain refined by the addition of a grain refining agent, there is a tendency for the melt to pick up gas again during, and as a result of, the grain refining treatment. On the other hand, if the melt is first grain refined and then degassed by the injection of chlorine gas, there is a pronounced tendency for grain coarsening to occur.

It is therefore a principal object of the invention to provide a method of treating a melt of magnesium-base alloy, prior to casting the metal, which overcomes the difficulties of prior methods.

It is a further object of the invention to provide an improved method of degassing a melt of magnesium-base alloy following a grain refining treatment with carbon or a carbon-containing grain-refining agent.

Still a further object of the invention is to provide an improved method of degassing a melt of magnesium-base alloy with a stream of chlorine gas.

Figure 2:
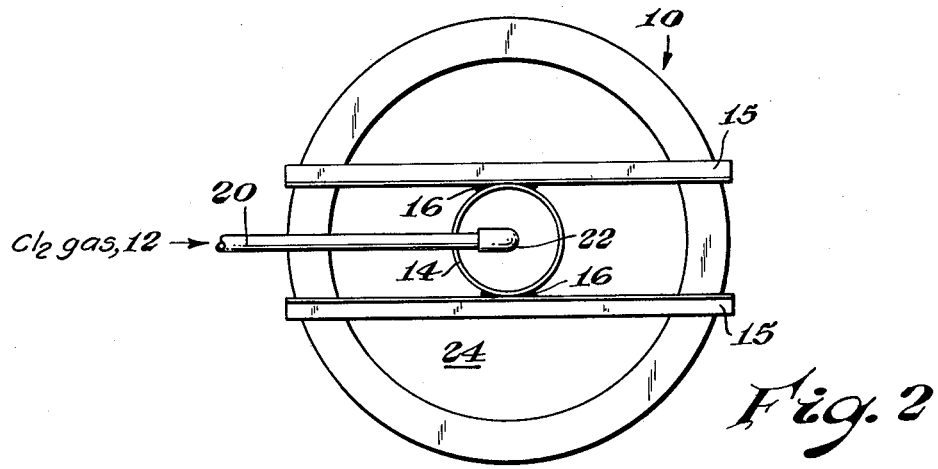
Figure 1:
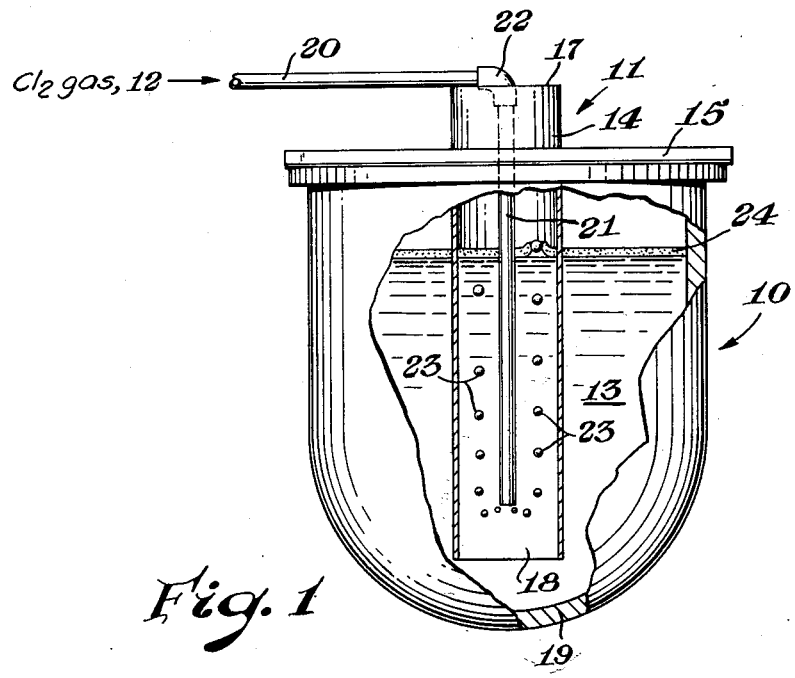

These and other objects and advantages of the present invention will be more fully understood upon becoming familiar with the following description and claims and the appended drawing, in which:

FIGURE 1 is a side elevational view, partly broken away, showing a form of apparatus usable in practicing the method of the invention; and FIGURE 2 is a top plan view of the apparatus shown in FIGURE 1.

The invention is predicated on the discovery that upon shielding a part of a melt of a magnesium-base alloy, containing carbon or a carbon-containing grain refining agent, from the remainder thereof and injecting chlorine gas into the so-shielded part of the melt until the entire melt is degassed, grain coarsening of the melt is substantially avoided.

Any magnesium-base alloy may be treated according to the process of the invention. A conventional magnesium chloride-free flux cover protects the melt from atmospheric attack. Generally, grain refining agents provided in the melt which is to be subjected to the degassing step, are, for example, finely divided carbon, lampblack, calcium cyanamide, calcium carbide, benzene hexachloride, hexachloroethane and the like. Hereinafter, for the purposes of the specification and claims, these grain refining agents are referred to as carbon-containing grain refining agents.

Generally, the addition during the grain refining step of about 1 percent by weight of carbon-containing grain refining agent, based on the weight of the melt, is sufficient to insure the presence of residual grain refining material at the end of the process of degassing the melt with chlorine gas by the method of the invention.

Suitable apparatus for the present process includes a crucible or melting pot provided with heating means, a baffle for separating the melt into a larger and a smaller portion, and means for injecting chlorine gas into the smaller portion of the melt in such a manner that the bubbles of chlorine gas sweep only through the smaller baffled part of the melt.

By way of illustration, a convenient specific type of apparatus is shown in the drawings, though other apparatus may be used if desired. As shown in FIGURE 1, the apparatus consists of a crucible indicated generally by the numeral 10, provided with baffled gas injection means, indicated generally by the numeral 11, for injecting chlorine gas 12 into the melt 13.

The baffled gas injection means 11, as shown, consists of a baffle 14 in the form of a relatively large diameter pipe of steel or other inert material preferably in the form of imperforate sheet or tube having elongated supporting members 15 attached thereto as by welds 16. The supporting members 15 are long enough to bridge the crucible 10 and are attached to the large diameter pipe 14 at an appropriate distance from the upper end 17 thereof to maintain the bottom end 18 of the pipe at least a short distance, such as 2 to 4 inches, from the bottom 19 of the crucible. The melt within the pipe 14 is thus clearly in communication with the melt surrounding the pipe.

Chlorine gas 12 from an appropriate source (not shown) is conveyed through pipe means 20 to an injection tube 21 which is connected to the pipe means 20 by a suitable joint 22. The injection tube 21 is generally made of graphite or other material which resists the attack of chlorine gas at elevated temperatures. The length of the injection tube 21 is made somewhat less than the length of the large diameter pipe 14 so that chlorine gas bubbles 23 are sure to rise through the melt within the confines of the large pipe 14 and erupt through the flux layer 24 into the surrounding atmosphere. If the injection tube 21 is substantially centrally disposed within the large diameter pipe 14, the chlorine bubbles are more likely to rise up through the melt without impinging upon and reacting with the large diameter pipe 14.

If a smaller portion of the melt is subjected to degassing, the chlorination period is necessarily longer. If the smaller or baffled portion of the melt is made an increasingly larger fraction of the melt, it is necessary to have more grain refining agent present in the melt in order to have residual grain refining action at the end of the degassing step.

By way of illustration, in a 30 inch diameter crucible having a rounded bottom as shown in FIGURE 1, the large pipe 14 desirably has a diameter of about 10 to 14 inches while the pipe means 20 and the injection tube 21 may each have an inner diameter of about one inch. The smaller baffled part of the melt by volume is thus in the order of about ⅕ to ¹⁄₁₀ of the entire melt, though somewhat larger proportions of melt may be shielded behind or within the baffle if desired.

In carrying out the process of the invention, a melt of magnesium-base alloy is provided which contains residual carbon or carbon-containing grain refining agent. The melt is also protected by a conventional magnesium-chloride free flux. A baffle is inserted into the crucible or pot in which the melt is held in such a manner that about ⅕ to ¹⁄₁₀ of the melt is shielded from the remainder. Then, while the melt is at a temperature in the range of about 1250° to 1400° F. (675° to 760° C.), chlorine gas is injected directly into the smaller baffled portion of the melt.

At temperatures below about 1250° F. the magnesium chloride formed during the degassing step is a solid rather than a liquid and tends to be entrapped in the melt. At somewhat higher temperatures the magnesium chloride is molten and rises to the surface of the melt where it covers and protects the melt from the ambient atmosphere thus preventing excessive burning.

At temperatures above about 1400° F. the chlorine gas reacts too readily with the molten magnesium resulting in an excessive loss of magnesium and a substantial consumption of chlorine so that little degassing is actually accomplished.

For a melt weighing about 550 pounds, the injection of about 5 to 15 liters per minute of chlorine under a pressure of 35–50 pounds per square inch and for a period of about 15 minutes is generally sufficient to degas the melt.

*Example*

The following example serves to illustrate the advantages of practicing the process of the invention.

A melt of magnesium-base alloy weighing 550 pounds and consisting of 6 percent of aluminum, 3 percent of zinc, 0.15 percent of manganese, the balance magnesium, was heated in a 30 inch diameter crucible to 1300° F. (704° C.) under a conventional flux cover and grain refined by stirring in an amount of calcium cyanamide corresponding to 1 percent by weight of the melt. A solidified four inch cube was cast from the grain refined melt. The cast cube was sectioned and examined and found to exhibit an average grain diameter of 0.008 to 0.010 inch, but excessive gas content of the melt was indicated by microporosity of the metal.

An assembly consisting of a one inch diameter graphite tube connected to a source of chlorine and having a mild steel pipe 10 inches in diameter open at both ends and disposed in substantially concentric relation thereto, was inserted into the melt to a depth of about 12–17 inches, i.e., to within 6–11 inches of the bottom of the crucible. The steel pipe projected about 3 inches below the open end of the graphite tube.

While the temperature of the melt was maintained at about 1300° F., chlorine was introduced into the melt within the mild steel pipe by means of the graphite tube. All of the chlorine bubbled up inside the steel pipe. A flow rate of about 10 liters of chlorine gas per minute was maintained for about 15 minutes. The melt then showed a low gas content as measured by the reduced pressure method test. According to this test, about 50 to 100 cc. of molten alloy are dipped out in a thin walled iron crucible, placed in an enclosed chamber having a window or view plate for the top wall, and the chamber evacuated to about 0.1 to 1 mm. of Hg pressure. The molten alloy in the crucible is observed as it cools and solidifies and gas bubbles issuing from the surface of the alloy are counted. If about 10 or fewer bubbles are observed, the alloy is adjudged to be satisfactorily degassed. A solidified four inch cube poured from the so-treated melt exhibited an average grain diameter of 0.008 to 0.010 inch indicating that the degassing treatment had not coarsened the grain structure.

*Comparison*

By way of comparison, a test was carried out in which a similar quantity of the magnesium-base alloy having the composition described in the example was grain refined in the same manner and a test specimen found to exhibit an average grain diameter of 0.008 to 0.010 inch. A one inch diameter graphite tube connected to a source of chlorine was inserted into the melt to a depth of about 15 inches. While the melt was at a temperature of 1350° F. (732° C.) chlorine gas was passed in at the rate of about 10 liters per minute. After about 15 minutes, the melt showed a low gas content as measured by the reduced pressure method test.

A four inch cube was then cast from the so-treated melt. The solidified cube was sectioned and examined and found to exhibit an average grain diameter of 0.025 to 0.030 inch, which is an undesirably coarse grain size.

Among the advantages of the present method is the ease with which it may be carried out in most any size or shape of crucible or pot with portable chlorine injection means.

I claim:

1. The improvement in the method of degassing a melt of magnesium-base alloy with chlorine following a grain refining treatment with a carbon-containing grain refining agent which comprises: maintaining said melt at a temperature between about 1250 and about 1400° F., inserting baffle means into the melt, said baffle means extending from the surface of the melt to about the bottom of the melt, and said baffle means shielding from about ⅕ to ⅒ of the melt while maintaining communication with the remainder thereof; and injecting chlorine gas into the so-shielded part of the melt until the entire melt is degassed.

2. The improvement in the method as in claim 1 in which the baffle is formed of substantially imperforate material.

3. The improvement in the method of degassing a melt of magnesium-base alloy with chlorine following a grain refining treatment with a carbon-containing grain refining agent which comprises: maintaining said melt at a temperature between about 1250° and about 1400° F.; providing a baffle means in the melt, said baffle means extending from the surface of the melt to about the bottom of the melt, and said baffle means shielding from about ⅕ to ⅒ of the melt from the remainder thereof while maintaining communication therewith; and injecting chlorine gas into the so-shielded part of the melt until the entire melt is degassed.

References Cited in the file of this patent
UNITED STATES PATENTS

| | | |
|---|---|---|
| 2,821,472 | Peterson et al. | Jan. 28, 1958 |
| 2,840,463 | Stroup et al. | June 24, 1958 |
| 2,976,143 | Sturkey et al. | Mar. 21, 1961 |